Figure 1:
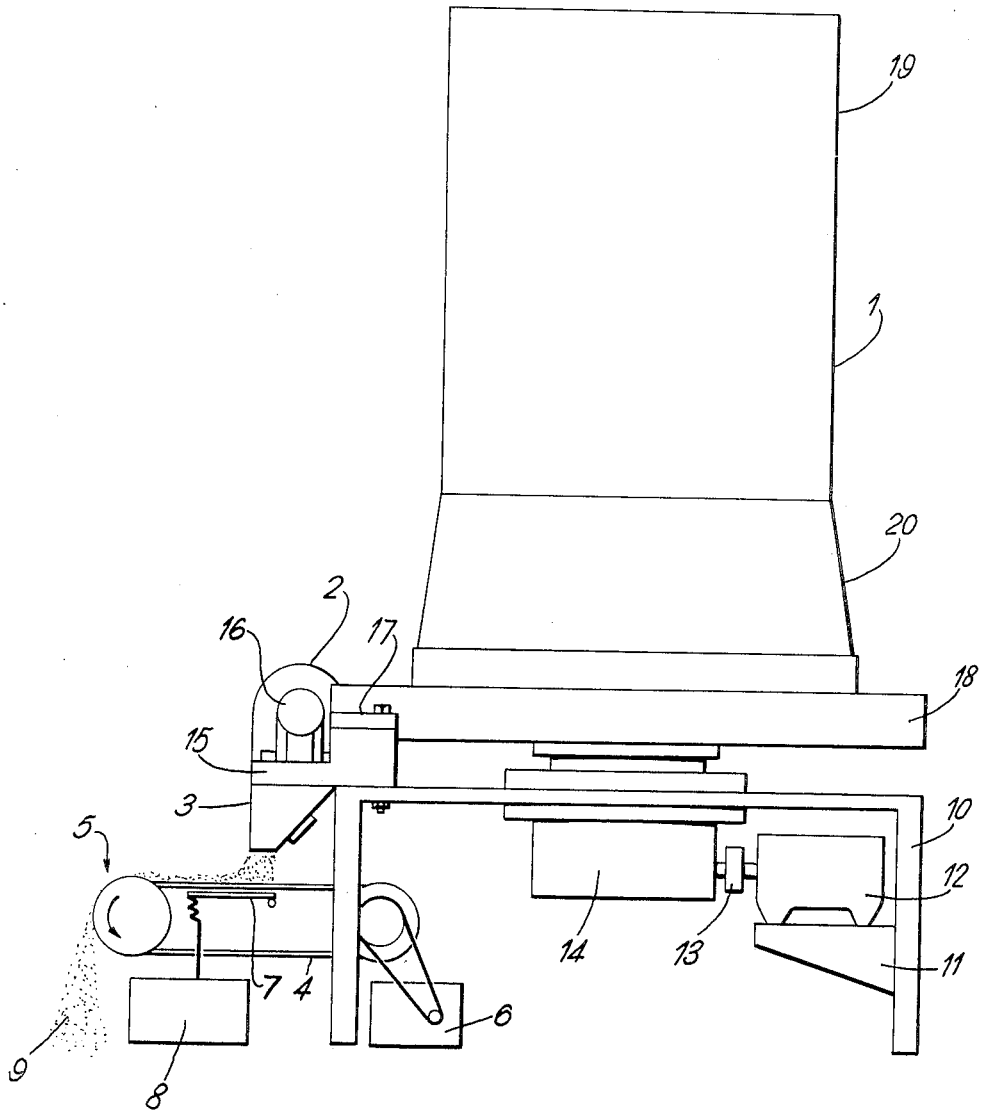
Figure 2:
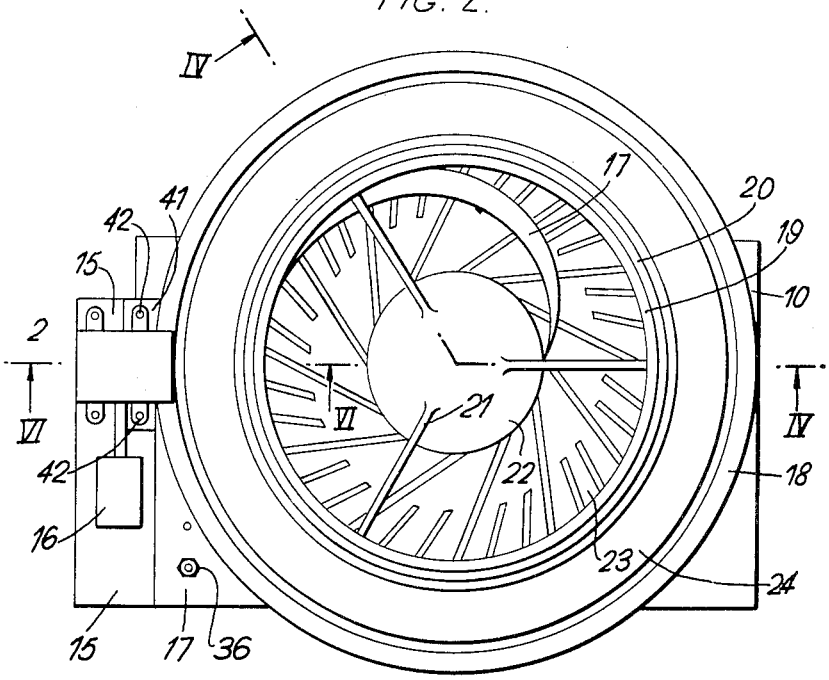
Figure 3:
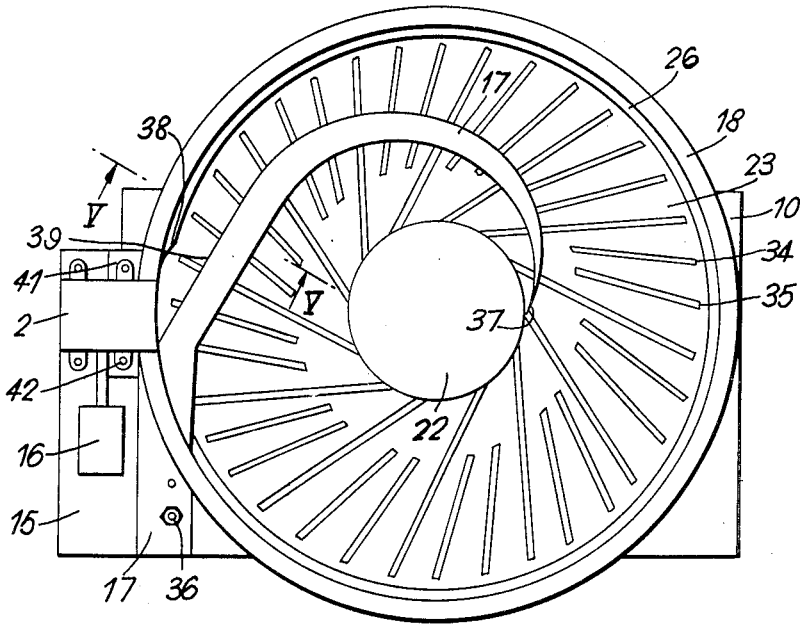
Figure 4:
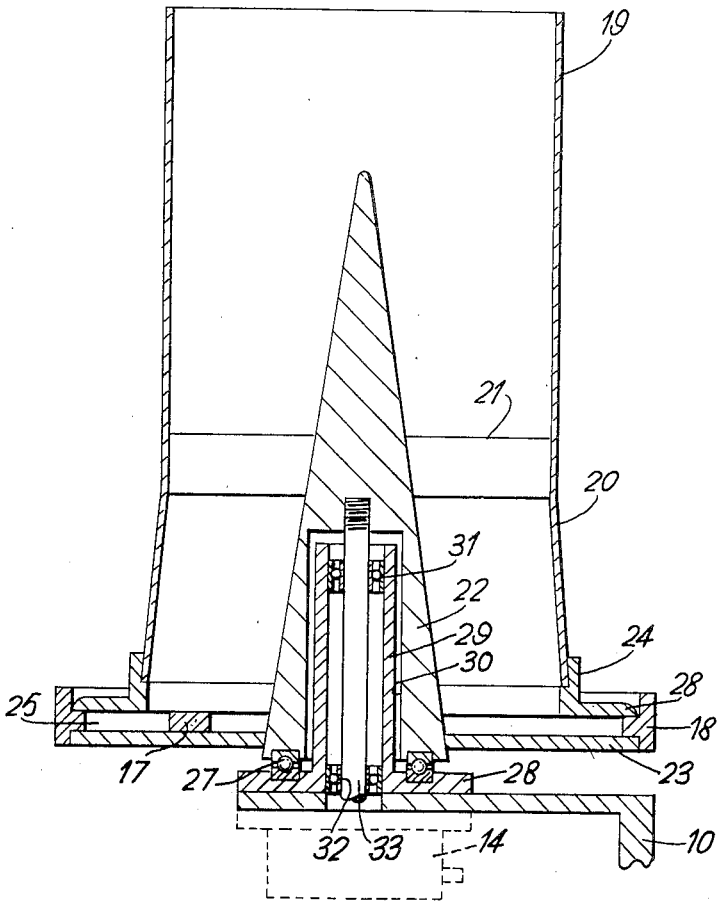
Figure 5:
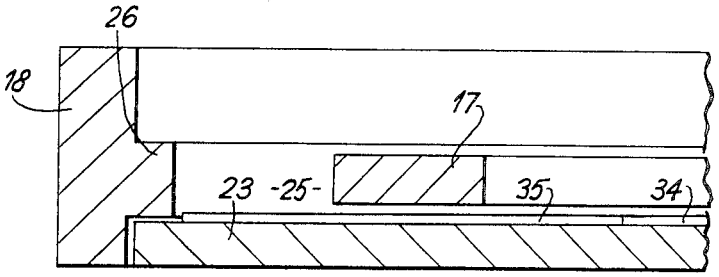
Figure 6:
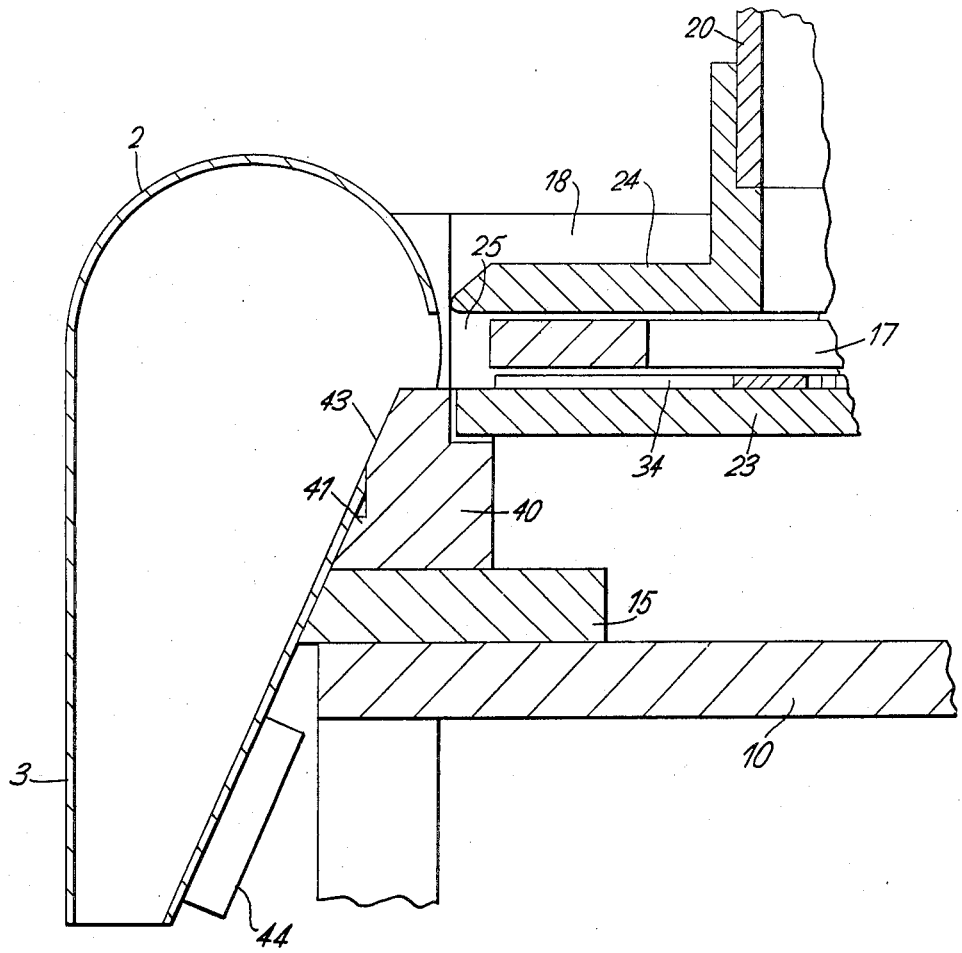

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 2, 1976

952 O.G. 9

T952,011
POWDER FEEDER

Gerald Coote, Welwyn Garden City, and Peter Terrick Stainforth, Knebworth, England, assignors to Imperial Chemical Industries Limited, London, England

Filed Dec. 5, 1975, Ser. No. 638,281
Claims priority, application United Kingdom, Dec. 9, 1974, 53,084/74
Int. Cl.[2] B02C *23/02*
U.S. Cl. 241—186.4
4 Sheets Drawing. 15 Pages Specification

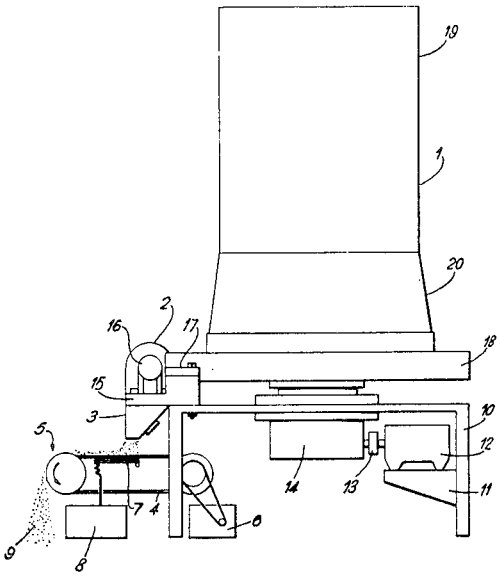

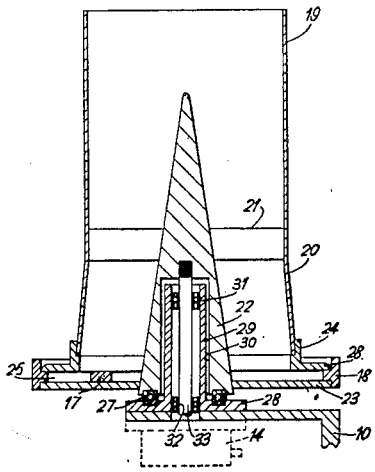

A rotary table feeder for cohesive powders is disclosed providing a volumetric output and comprising a rotary table 23, a hopper 1 mounted in spaced relationship to the rotary table and connected so that it is rotatable with the table, and a stationary plough 17 located between the hopper and the table, and extending from the edge of the table, the table having a greater diameter than the hopper and an annular plate 24 being provided which is spaced-apart from the table 23, the plate being fastened to and extending outwards from the base of the hopper so that it is rotatable with the hopper and table, a stationary skirt 18 provided around the periphery of the table and plate in sliding engagement therewith, the skirt having adjacent the end of the plough 17 an exit region through which the powder is delivered on rotation of the table and hopper.

By curving the plough into a spiral of less than one turn, shearing of the powder may be minimized. Slip between the powder and the table or plate is minimized by the provision on the table or plate of ribs inclined to the radii so that their outer extremities lag behind the inner portions.

In operation cohesive powders are consolidated into a uniform ribbon by the feeder, and may be reconstituted back to powder, e.g. by milling cutter. A constant weight feed of as low as 0.2 kg. hr.$^{-1}$ of cohesive powder may then be accurately obtainable by feeding the reconstituted powder to a weigh feeder which gravimetrically monitors the feed rate and adjusts the rate of table rotation accordingly. The disclosed powder feeder is particularly useful in distributing small quantities of powder materials into another material, such as the addition of fire retardants, pigments or the like to plastics materials.